United States Patent
Roussel et al.

(10) Patent No.: US 8,341,464 B2
(45) Date of Patent: Dec. 25, 2012

(54) DIAGNOSTIC DASHBOARD FOR WEB PAGES

(75) Inventors: Corey M. Roussel, Redmond, WA (US); Bharathwaj R Sampathkumar, Redmond, WA (US); Jian Zhang, Sammamish, WA (US); Zohar Raz, Redmond, WA (US); Ivonne D. Galvan Coiffier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/769,027

(22) Filed: Apr. 28, 2010

(65) Prior Publication Data

US 2011/0271149 A1 Nov. 3, 2011

(51) Int. Cl.
*G06F 11/00* (2006.01)
(52) U.S. Cl. .......... 714/38.1; 709/223; 709/224
(58) Field of Classification Search .......... 714/38
See application file for complete search history.

(56) References Cited

U.S. PATENT DOCUMENTS

| | | | |
|---|---|---|---|
| 6,925,335 B2 * | 8/2005 | May et al. ................ | 700/9 |
| 7,085,999 B2 * | 8/2006 | Maeda et al. ............. | 715/236 |
| 7,574,494 B1 * | 8/2009 | Mayernick et al. ........ | 709/222 |
| 7,644,315 B2 * | 1/2010 | Tsun ...................... | 714/38.14 |
| 2001/0054049 A1 * | 12/2001 | Maeda et al. ............. | 707/517 |
| 2006/0235947 A1 * | 10/2006 | Gray et al. ............... | 709/218 |
| 2007/0002295 A1 | 1/2007 | Reuhman-Huisken et al. | |
| 2007/0271375 A1 | 11/2007 | Hwang | |
| 2008/0126325 A1 | 5/2008 | Pugh et al. | |
| 2009/0099701 A1 * | 4/2009 | Li et al. ................... | 700/284 |
| 2009/0119280 A1 * | 5/2009 | Waters et al. ............. | 707/5 |
| 2009/0276771 A1 * | 11/2009 | Nickolov et al. .......... | 717/177 |
| 2010/0082790 A1 * | 4/2010 | Hussaini et al. ........... | 709/223 |
| 2010/0095155 A1 * | 4/2010 | Tsun ...................... | 714/32 |
| 2011/0216064 A1 * | 9/2011 | Dahl et al. ............... | 345/428 |
| 2011/0314403 A1 * | 12/2011 | Yan ....................... | 715/772 |

OTHER PUBLICATIONS

"16 Working with the Diagnostic Dashboard", Retrieved at << http://download.oracle.com/docs/cd/B32386_01/generic.902/b32136/diagndashbrd.htm >>, Retrieved Date: Mar. 15, 2010, pp. 12.
"Intercept Studio 5", Retrieved at << http://www.avicode.com/productsinterceptstudiooverview.htm >>, Retrieved Date: Mar. 15, 2010, pp. 2.
Hari., "Zoho Meeting: Instant PC Diagnostics with Remote Support", Retrieved at << http://blogs.zoho.com/general/instant-pc-diagnostics-with-zoho-meeting-s-remote-support >>, Oct. 11, 2009, pp. 5.
"Finacle WatchWiz", Retrieved at <<http://www.infosys.com/finacle/pdf/Finacle-WatchWiz.pdf>>, 2009, pp. 4.
"Wind River Test Management 3.2", Retrieved at <<http://www.windriver.com/products/product-notes/PN_Test_Management_1009.pdf>>, 2009, pp. 1-9.

* cited by examiner

*Primary Examiner* — Kamini Patel
(74) *Attorney, Agent, or Firm* — Turk IP Law, LLC

(57) ABSTRACT

A diagnostic dashboard for web applications is provided. The dashboard is presented in a portion of a web page in response to activation of a control in form of a frame along with partially displayed web page contents. Designers and administrators are provided informative data to assist them in discovering root causes for page malfunctioning or slowness, and are enabled to access call stack and exception information in error messages.

17 Claims, 7 Drawing Sheets

DIAGNOSTIC DASHBOARD FOR WEB PAGES

BACKGROUND

With the increasing popularity of web applications located on servers within an enterprise or online (hosted offering) and accessed by clients for a wide variety of operations, typical tasks of computer applications are being taken over by document sharing, search, analysis, reporting, data mining, and similar web services. Web applications enable users to perform the same tasks as with local applications through user interfaces provided within a browsing application user interface.

In a typical web application, there are many interactions that take place, many of them automatically. For example, a search request by a user through their browsing application may involve communication from the client device, on which the browsing application is executed to a front end server of the web service. The web service may formulate one or more queries based on the user's request, submit the queries to servers managing various data stores, perform operations on one or more servers (e.g. filtering and/or caching results, etc.) and provide the results to the client device for rendering. At each step along the process potential problems may occur due to system resources (e.g. available memory, processing capacity, communication bandwidth, etc.). In addition, problems may occur due to software issues. Since a number of devices, software applications, and process steps are involved even in simple interactions, it is not an easy task for a developer to diagnose problems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a diagnostic dashboard, which may be presented in a portion of a web page in response to activation of a control. According to some embodiments, the diagnostic dashboard may be presented in form of a frame along with partially displayed web page contents and provide designers and administrators informative data to assist them in discovering root causes for page malfunctioning or slowness, and enable access to call stack and exception information in error messages.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
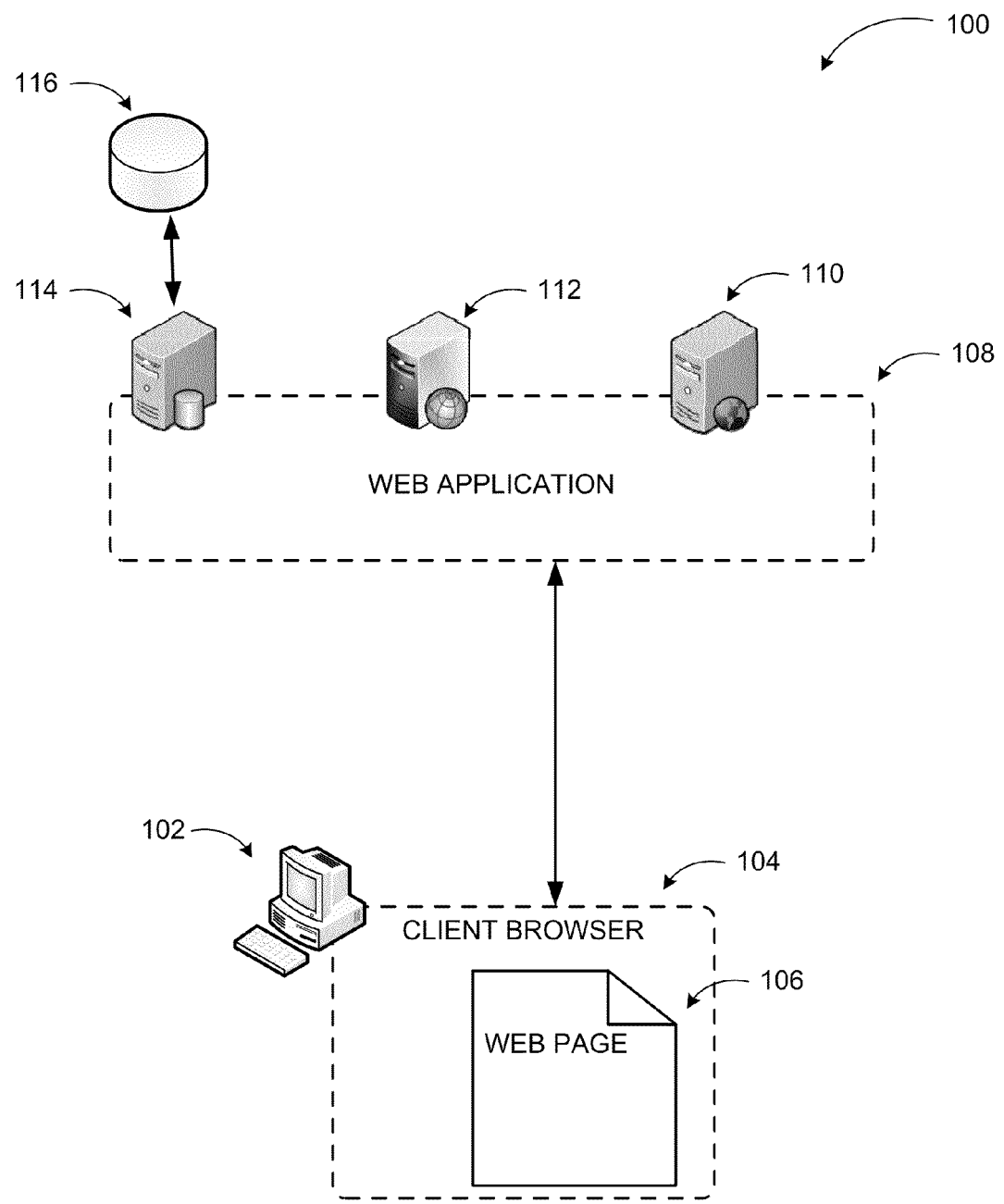
FIG. 1 is a conceptual diagram illustrating a structure of a web service, where a diagnostic dashboard according to embodiments may be employed.

As briefly described above, designers and administrators may be provided informative data to assist them in discovering root causes for page malfunctioning or slowness and enabled access to call stack and exception information in error messages through a diagnostic dashboard. The diagnostic dashboard may be presented in response to activation of a diagnostic control as a frame on the web page along with partially displayed web page contents. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may provide web applications with hosted web pages and diagnostic information. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating a structure of a web service, where a diagnostic dashboard according to embodiments may be employed. The networked web application environment shown in diagram 100 is for illustration purposes. Embodiments may be implemented in various networked environments such as enterprise-based networks, cloud-based networks, and combinations of those.

In a conventional system, a user has locally installed applications on their computing device for editing or viewing documents, performing computations or analyses, storing data, and other tasks. Such applications not only consume resources, but they also present the challenge of each user's machine having to be set up initially, maintained with hardware and software upgrades, debugged individually in case of problems, etc. Addressing many of the challenges of the locally installed application model, web applications provide access to the same services through a distributed computing model, where the application performing the tasks is executed on one or more servers and accessed through client devices by the users.

Increasingly popular, web applications are replacing the individual computing model in a networked environment. In a typical operation, a user may access web application 108 through a browsing application 104 executed on their client device 102. The services are usually provided through one or more web pages (e.g. web page 106). For example, the user may access a document sharing service. The service may present a list of available documents through a graphical user interface in a first web page. Upon selection of a document from the list, the selected document may be made available through a second web page. The user may be enabled to edit, view, or perform other tasks on the selected document through user interface elements provided on web page 106.

Web application 108 may be executed on one or more servers (e.g. web server 110, application server 112, and database server 114) and interact with other applications. For example, web server 110 may provide front end services, while application server 112 executes ancillary applications. Database server 114 may receive query requests and retrieve data from back end data stores such as data store 116.

In a web service environment, it is easy to affect the performance of a web page through seemingly innocuous changes. A new web part or even a slight view change may have a noticeable impact on the web page's resource use. However, detecting these changes as they are made may be often difficult. The key data points are typically available to users with direct access to the server and a debugger. Thus, direct access approach is not scalable for even a limited number of developers trying to diagnose problems. In a hosted application environment, this approach may become a major challenge.

In a system according to embodiments, a diagnostic control presented on web page 106 may activate a diagnostic dashboard, which may provide data for discovering root causes for page malfunctioning or slowness and enable access to call stack and exception information in error messages through the same web page.

The example system in FIG. 1 has been described with specific servers, client devices, web applications, and interactions. Embodiments are not limited to systems according to these example configurations. A platform providing integrated user interface controls for web dialogs may be implemented in configurations employing fewer or additional components and performing other tasks. Furthermore, specific protocols and/or interfaces may be implemented in a similar manner using the principles described herein.

Figure 2:
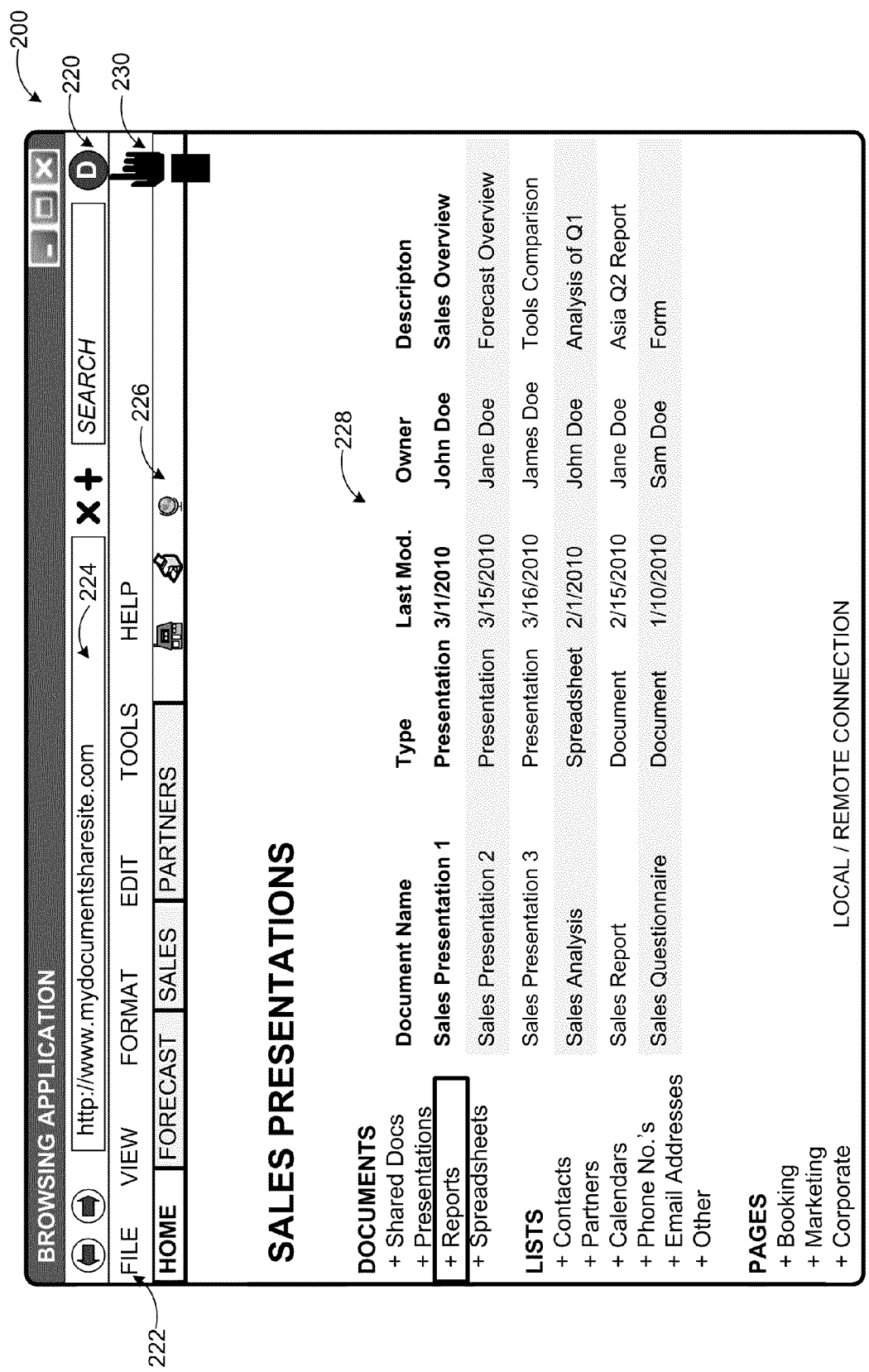
FIG. 2 illustrates an example web page with a diagnostic dashboard control.
Figure 3:
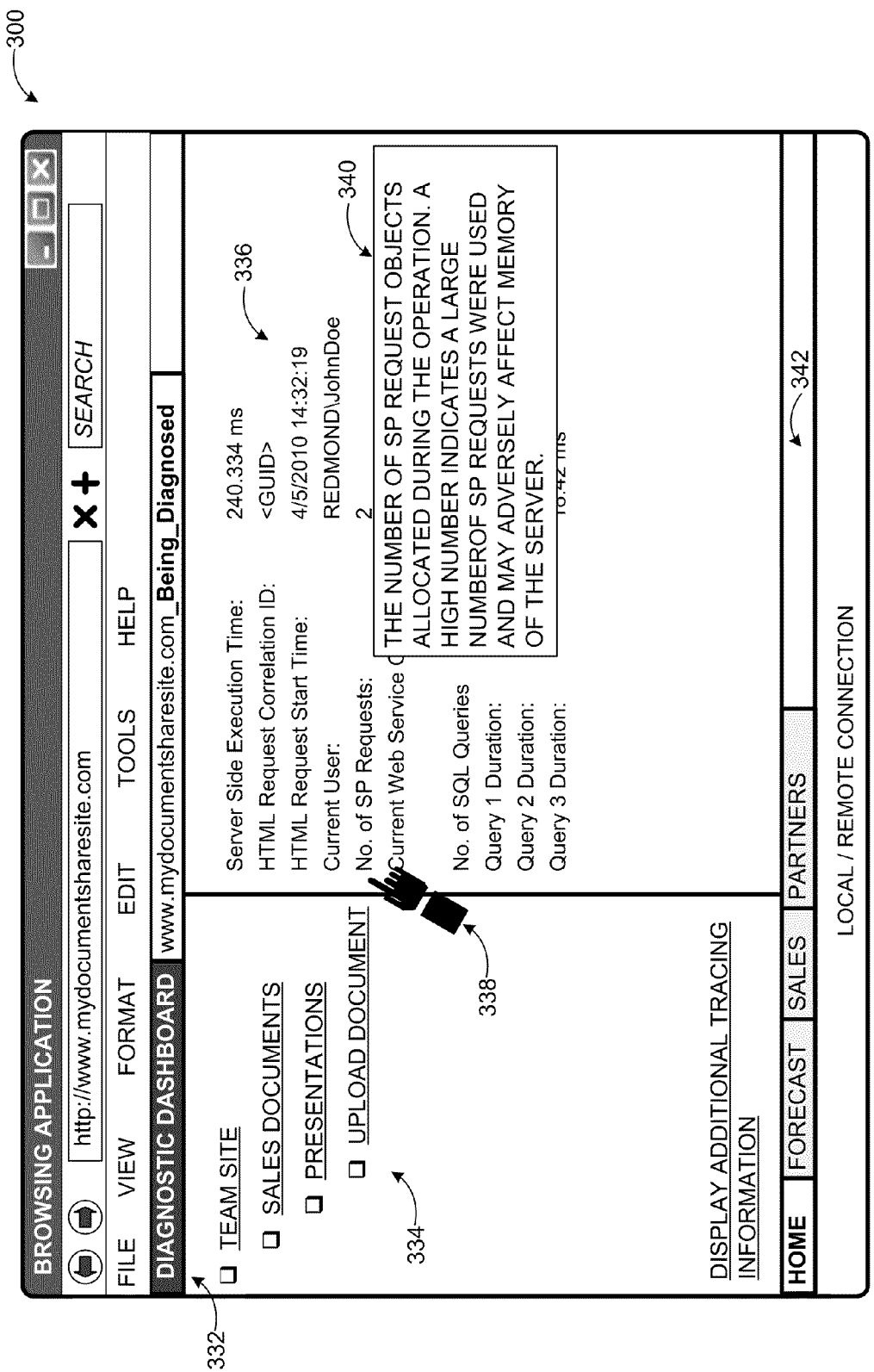
FIG. 3 illustrates an example display of diagnostic information in response to activation of the diagnostic dashboard.
Figure 4:
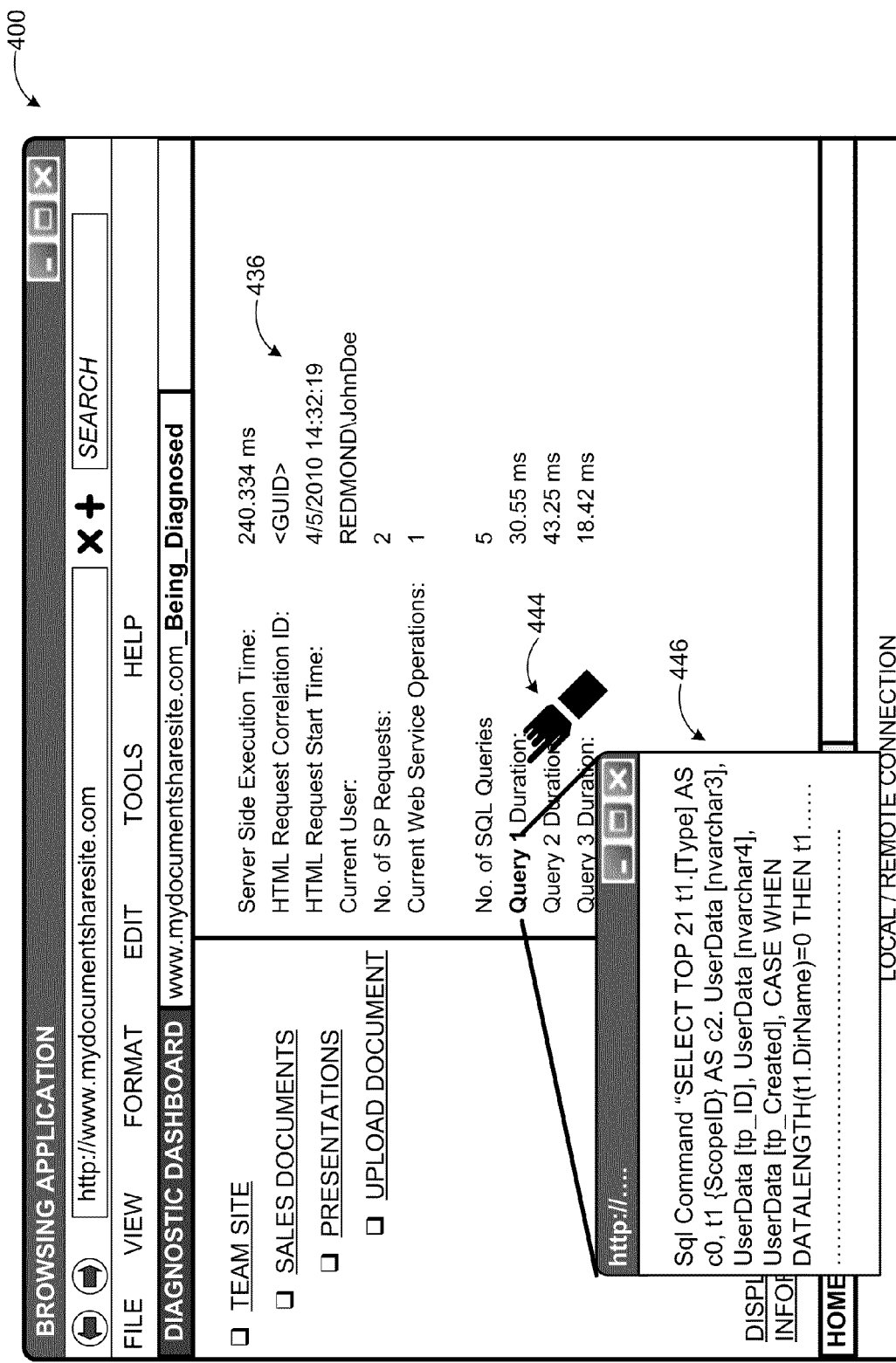
FIG. 4 illustrates another example display of diagnostic information in response to activation of the diagnostic dashboard.

FIG. 2 illustrates an example web page with a diagnostic dashboard control. Embodiments are not specific to any web page type or browsing application, and may be employed by any web service. Browsing application web page 200 and the example web pages in FIGS. 3 and 4 are for illustration purposes.

Web page 200 illustrates an example document list view of a document sharing web application, where embodiments may be implemented. A user may access a web application such as a document sharing service through a browsing application. Web page 200 includes standard user interface elements such as text box 224 for entering the Uniform Resource Locator (URL) address of the web application, a search box, and command menus 222 (e.g. "file", "view", "edit", etc.). The menu items may provide the user a drop-down menu, a hover-on menu, or similar options for selecting various tasks associated with the browsing application.

The example web application may include a number of top level web pages such as "Home", "Forecast", "Sales", and "Partners", which may be made available using tabs or similar presentation methods. In the example of FIG. 2, the user is at the "Sales Presentations" page provided by the web application. A tree-structure menu of available pages may be provided on one side of the displayed web page. The web page "Sales Presentations" presents a list 228 of available documents with summary information such as document type, modification date, owner, short description, etc. User interface elements such as graphical controls 226 may enable the user select tasks associated with the listed documents. For example, the user may create a new document, a new folder, view an existing document, edit an existing document, attach a tag to a document, etc. The user may accomplish some of the same tasks by clicking on one of the documents in the list 352 as well.

A web application according to embodiments may enable display of a diagnostic control 220 on web page 200. Diagnostic control 220 may be presented as a graphical element, a textual element, or a combination of both. Moreover, diagnostic control 220 may be displayed in a menu bar of the user interface along with other control elements or on any other location on the web page. Upon activation of the diagnostic control 220 such as by clicking on it (230), a diagnostic dashboard may be displayed as discussed in more detail below. According some embodiments, the diagnostic dashboard may also be activated by entry of a specific hypertext transport protocol (http) header or by appending a query parameter to the address (URL) of the web page (e.g. http://contoso.com/page.aspx?DiagnosticDashboard=True).

According to further embodiments, a property associated with the diagnostic dashboard may be defined. When the property is set to an "off" value, the dashboard may be disabled (e.g. for regular users). When the property is set to an "on" value, the dashboard may be enabled on the user interface displaying available performance statistics for every requested page. Another value for the diagnostic dashboard property may be "on-demand", which may enable a user (e.g. a developer or an administrator) to turn the dashboard on or off by activating the diagnostic control 220.

FIG. 3 illustrates an example display of diagnostic information in response to activation of the diagnostic dashboard.

Upon activation of the diagnostic control or the diagnostic dashboard property being set to "on" value, the diagnostic dashboard frame 332 may be displayed on web page 300 presenting performance metrics and associated information. According to some embodiments, the diagnostic dashboard frame 332 may be displayed in an upper portion of the web page with the contents of the web page being displayed in a reduce format at a bottom portion. In FIG. 3, contents of the web page 342 are shown as reduced to tabs only, but this is for illustration purposes only. Any portion of the web page may be displayed based on default properties, available viewing space, user preferences, and so on. According to other embodiments, the diagnostic dashboard frame 332 may be displayed at a lower portion of the web page or on left/right side of the page, as well. The diagnostic dashboard frame may also be displayed in a pop-up window or similar user interface.

The diagnostic dashboard frame 332 may include two sub sections, a navigation section 334 (e.g. on the left), and a properties section 336 (e.g. on the right). The navigation section 334 may be a clickable indented list that describes the page's hierarchy of scopes starting from the root page request. Selection of any listed scope may display the collected properties for the selected scope inside the properties section 336 on the right. According to some embodiments, this may aggregate the scopes below the selected one. Developers or administrators may define these monitored scopes and sub scopes in code, to break down the data that is collected and later displayed in the diagnostic dashboard frame in order to isolate a problem during investigation.

Diagnostic dashboard frame 332 may display a page performance metric, which may be a user-friendly rollup of the other statistics. Functionality metrics may also be displayed. For example, if the web page renders incorrectly, but quickly, an exception might be displayed in the dashboard. Moreover, a number of queries, a resource cost of queries (e.g. disk I/O, execution plan data, etc.), page rendering time, and similar information may be presented to a developer or administrator. Table 1 illustrates some example performance metrics that may be used by a diagnostic dashboard according to embodiments. Embodiments are not limited to the listed metrics, however. Any developer or administrator defined metric may be employed by a web application according to embodiments.

TABLE 1

List of example performance metrics

| Metric | Description | Units |
|---|---|---|
| Execution time (Server Side) | The amount of time in milliseconds that the operation took to perform on the server (not including network delays and client page rendering cost) | Milliseconds |
| Current Operation | The current operation for which these statistics apply | <string> |
| HTML Request correlation ID | | <GUID> |
| HTML Request Start Time | | Date Time |
| Current User | The active user sending the request | Domain\name |
| Request Objects | The number of request objects allocated during this operation. A high number here may indicate that a large number of sites or web objects were used. This can adversely affect memory use on the server. | <Number> |
| Current Web Service Operations | The number of operations currently executing web service code. A high number here indicates heavy load on the server. Adding additional machines to distribute this traffic across the farm may be considered. | <Number> |
| Number of Queries | The queries performed during this operation | <Number> |
| Per each Query: Query duration | | Milliseconds |
| Per each Query: Link to Query Text | | <Text> |

Furthermore, explanatory information 340 such as description of an error and how the problem can be corrected may be displayed in a hover-on (or similar) style information box upon user selection (338) of a particular metric. Of course, other forms of displaying explanatory information and corrective action suggestions may also be employed.

FIG. 4 illustrates another example display of diagnostic information in response to activation of the diagnostic dashboard. One of the goals of a diagnostic dashboard according to embodiments is enabling a developer or administrator to quickly access detailed error information. This may be accomplished by a "Show error details" switch. The switch may enable display of the call stack and exception information in error messages by changing CallStack attribute in the configuration file. Call stack and exception information may potentially lead to information disclosure. When setting any of the properties for this feature, an administrator may select which level of functionality is allowed. The level may be set using the property value. For example, users who have the rights to remove web parts from the page may be allowed to see the diagnostic dashboard control and the diagnostic dashboard frame. If the diagnostic dashboard setting is set to "on", the diagnostic dashboard control and the diagnostic dashboard frame may appear on all pages associated with the web service and to all the users who have the right to remove a web part in the page their viewing.

Web page 400 illustrates another example feature of a diagnostic dashboard according to embodiments. As mentioned previously, performance information provided by the dashboard may include links to query text for each query listed in the properties section 436. For example, in response to user selection (444) of a listed query "Query 1", a dialog may be activated displaying the text of the query to assist developers or administrators debug a problem.

As discussed previously, the diagnostic dashboard frame may be displayed as a portion of the web page with the remaining portion displaying the actual contents. The display areas for the dashboard and the actual contents may be predetermined or dynamically adjusted. Alternatively, the diagnostic dashboard may be displayed as a dialog or as a separate web page as well.

The examples in FIG. 2 through 4 have been described with specific user interface elements, configurations, and interactions. Embodiments are not limited to systems according to these example configurations. Diagnostic dashboards for web applications may be implemented in configurations using other types of diagnostic metrics, user interface elements, and configurations in a similar manner using the principles described herein.

Figure 5:
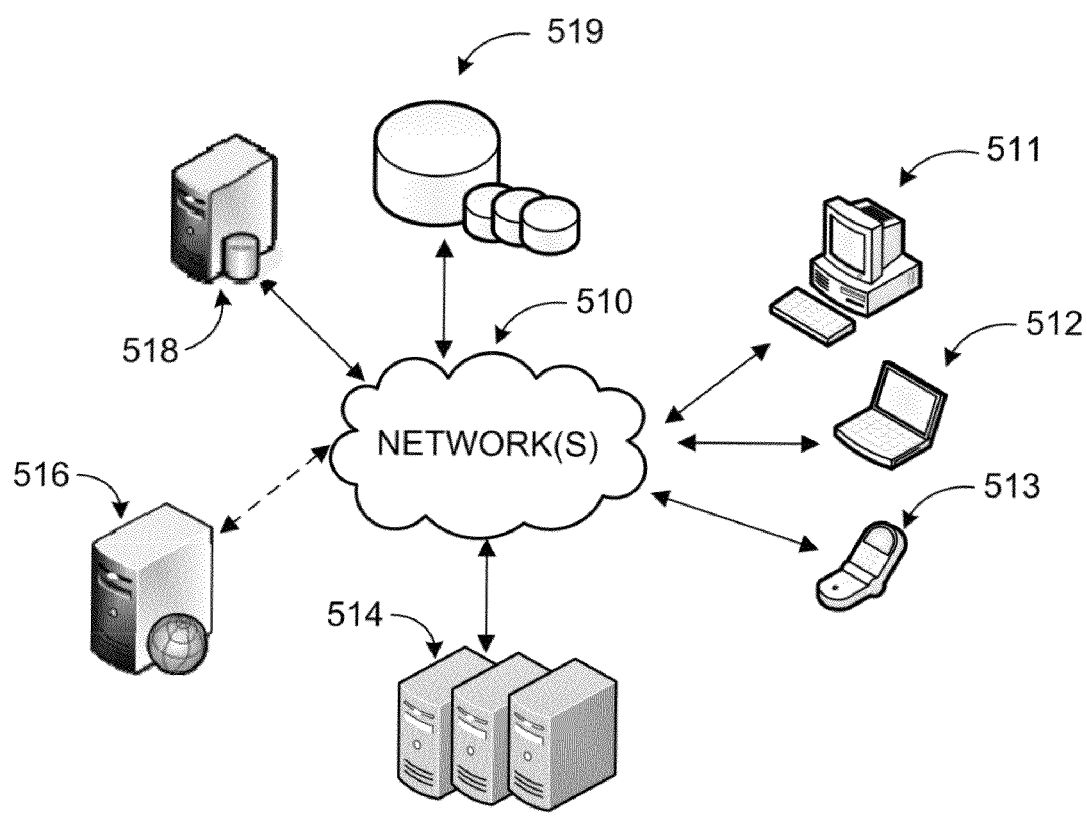
FIG. 5 is a networked environment, where a system according to embodiments may be implemented.

FIG. 5 is an example networked environment, where embodiments may be implemented. A diagnostic dashboard for web pages may be implemented via software executed over one or more servers 514 such as a hosted service. The platform may communicate with client applications on individual computing devices such as a smart phone 513, a laptop computer 512, or desktop computer 511 (client devices') through network(s) 510.

Client applications executed on any of the client devices 511-513 may interact with a web application through a browsing application on the servers 514, or on individual server 516. Detailed error information, which can be used to discover root cause of page malfunction or poor performance, may be made easily accessible to developers and administrators through a real time diagnostic dashboard. The dashboard may be enabled by a browser for a single request. Launching the dashboard may put the server(s) into a diagnostic mode for the code executed during that request, so that more information, which would ordinarily be resource expensive for a normal request, can be collected. Furthermore, on-demand information for error discovery may also be provided as part of the dashboard as discussed previously. The web application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing diagnostic dashboards. Furthermore, the networked environments discussed in FIG. 5 are for illustration purposes only. Embodiments are not limited to the example applications, modules, or processes.

Figure 6:
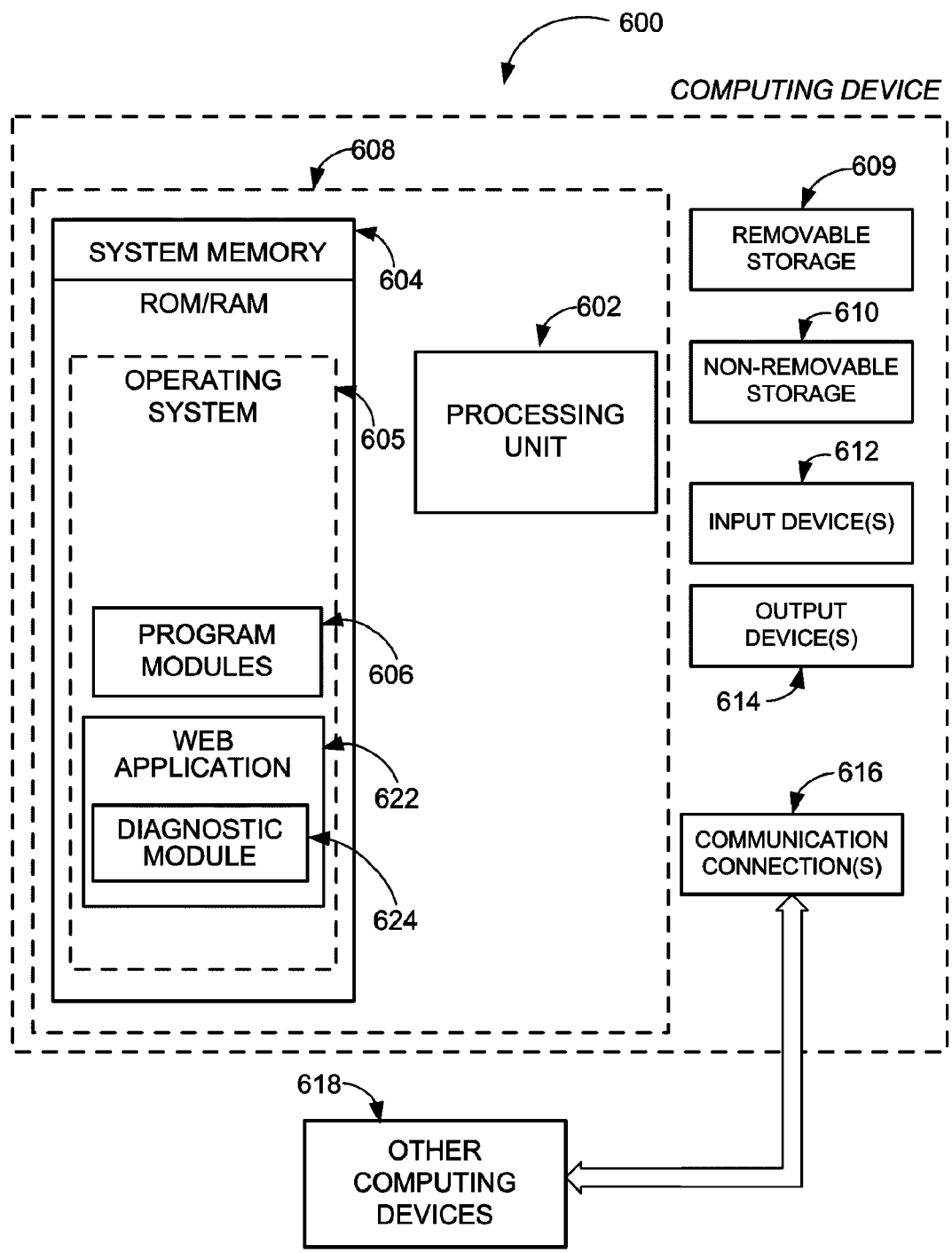
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server executing a web application capable of providing hosted web pages with diagnostic dashboard capability according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, web application 622, and diagnostic module 624.

Web application 622 may provide web-based services to remote users through a browsing application on the user's client device. Through the diagnostic module 624, web application 622 may provide designers and administrators informative data to assist them in discovering root causes for page malfunctioning or slowness as discussed previously. Web application 622 and diagnostic module 624 may be separate applications or an integral component of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
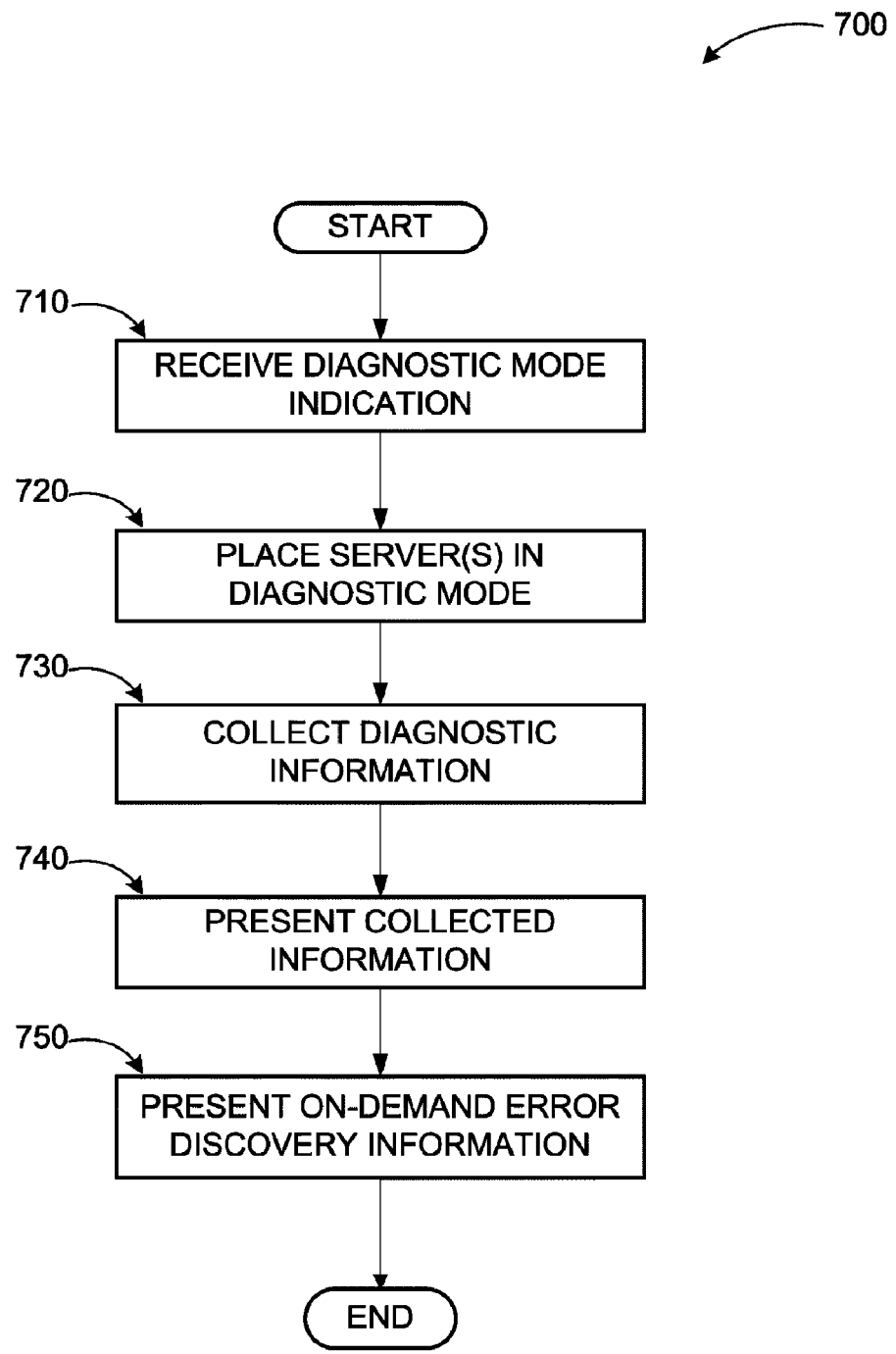
FIG. 7 illustrates a logic flow diagram for a process of providing a diagnostic dashboard in a web application according to embodiments.

FIG. 7 illustrates a logic flow diagram for process 700 of providing a diagnostic dashboard in a web application according to embodiments. Process 700 may be implemented as part of a web application executed on a server.

Process 700 begins with operation 710, where a diagnostic mode indication (e.g. activation of a diagnostic control on the web page) is received at the web application from a user's browsing application. At operation 720, the web application may place servers involved in the web service in diagnostic mode such that information associated with executed processes (e.g. queries) and communications can be collected.

The diagnostic information is collected at operation 730 by the web application and presented to the user (e.g. a developer or administrator) through the user's browsing application at operation 740 as the processes for the web page are being executed. At operation 750, on-demand error discovery information may be presented to the user to provide them explanations on displayed diagnostic data. According to some embodiments, the diagnostic dashboard may be configured to present diagnostic information across a multi-tier web application executed across a front end server, an application server, and a back end database server.

The operations included in process 700 are for illustration purposes. Diagnostic dashboards for web pages may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a diagnostic dashboard by a web application, the method comprising:
presenting a web page to a user from the web application;
receiving a diagnostic mode indication;
activating a diagnostic mode at one or more servers associated with the web application;
collecting diagnostic information, wherein the collected diagnostic information is displayed through a diagnostic dashboard frame presented over a portion of the web page;
displaying the collected diagnostic information on the web page while continuing to display at least a portion of the web page contents; and
continuing to display actual contents of the web page over another portion of the web page in a reduced format, wherein a size ratio of the diagnostic dashboard frame and the actual contents of the web page is determined based on one of: a predefined default value, and a dynamic adjustment process, wherein a location of the diagnostic dashboard frame and the actual contents of the web page is determined based on one of: a predefined default value, and a dynamic adjustment process.

2. The method of claim 1, further comprising:
displaying on-demand error discovery information as part of the diagnostic dashboard.

3. The method of claim 1, further comprising:
defining a diagnostic dashboard property;
if the diagnostic dashboard property is assigned an "off" value, disabling the diagnostic dashboard;
if the diagnostic dashboard property is assigned an "on" value, displaying the diagnostic dashboard for every requested page from the web application; and
if the diagnostic dashboard property is assigned an "on-demand" value, displaying the diagnostic dashboard in response to activation of a diagnostic dashboard control presented on the web page.

4. The method of claim 3, wherein the diagnostic dashboard control includes one of: a graphical user interface element, a textual user interface element, and a combination of graphical/textual user interface element.

5. The method of claim 1, further comprising:
enabling access to call stack and exception information in error messages through the diagnostic dashboard.

6. The method of claim 1, wherein the diagnostic dashboard frame includes a navigation section and a properties section.

7. The method of claim 6, wherein the navigation section includes a clickable indented list of the web page's hierarchy of scopes starting from a root page request.

8. The method of claim 6, wherein the properties section includes:
a listing of collected performance metrics comprising at least one from a set of: a page performance metric, a number of performed queries, a resource cost of performed queries, a page rendering time, timing information associated with a current request, and a number of current operations; and
a listing of functionality metrics comprising exception messages.

9. A server for providing a web application employing a diagnostic dashboard, the server comprising:
a memory;
a processor coupled to the memory, the processor executing diagnostic module, wherein the diagnostic module is configured to:
present a parent web page to a user, wherein the web page includes a diagnostic dashboard control;
in response to receiving a user activation of the diagnostic dashboard control, activate diagnostic mode at one or more servers associated with the web application;
collect diagnostic information from the one or more servers, wherein the collected diagnostic information is displayed through a diagnostic dashboard frame;

enable display of the diagnostic dashboard frame on a portion of the web page, wherein the diagnostic dashboard frame includes a navigation section presenting a clickable indented list of the web page's hierarchy of scopes starting from a root page request and a properties section presenting a listing of collected metrics associated with a scope selected on the navigation section; and continue to display actual contents of the web page over another portion of the web page in a reduced format, wherein a size ratio of the diagnostic dashboard frame and the actual contents of the web page is determined based on one of: a predefined default value, and a dynamic adjustment process, wherein a location of the diagnostic dashboard frame and the actual contents of the web page is determined based on one of: a predefined default value, and a dynamic adjustment process.

10. The server of claim 9, wherein the displayed metrics for the selected scope are include aggregated values for sub-scopes below a hierarchical level of the selected scope.

11. The server of claim 9, wherein the properties section includes at least one from a set of: an aggregated page metric, a number of performed queries, a resource cost of performed queries, a listing of performed queries, a page rendering time, timing information associated with a current request, and a number of current operations.

12. The server of claim 11, wherein the diagnostic module is further configured to:

in response to selection of a listed query on the properties section, display a text of the query in one of a dialog and a hover-on text box.

13. The server of claim 9, wherein the diagnostic module is further configured to:

in response to selection of a performance metric on the properties section, display explanatory information in one of a dialog and a hover-on text box, wherein the explanatory information includes a description of a detected error and a corrective action suggestion.

14. The server of claim 9, wherein the one or more servers include at least one from a set of: a web server, an application server, and a database server.

15. A computer-readable memory device with instructions stored thereon for providing a diagnostic dashboard for a web application, the instructions comprising:

presenting a web page to a user, the web page including a diagnostic dashboard icon;

in response to one of: a diagnostic dashboard property being assigned an "on" value, receiving an appended query parameter in a web page address, and receiving a user activation of the diagnostic dashboard icon, collecting diagnostic information from the one or more servers associated with the web application, wherein the collected diagnostic information is displayed through a diagnostic dashboard frame presented over a portion of the web page;

reducing a size of displayed actual contents on the web page;

displaying the diagnostic dashboard frame on a portion of the same web page, wherein the diagnostic dashboard frame includes a navigation section presenting a clickable indented list of the web page's hierarchy of scopes and a properties section presenting a listing of collected performance metrics associated with a scope selected on the navigation section; and continuing to display actual contents of the web page over another portion of the web page in a reduced format, wherein a size ratio of the diagnostic dashboard frame and the actual contents of the web page is determined based on one of: a predefined default value, and a dynamic adjustment process, wherein a location of the diagnostic dashboard frame and the actual contents of the web page is determined based on one of: a predefined default value, and a dynamic adjustment process.

16. The computer-readable memory device of claim 15, wherein the instructions further comprise:

providing an error detail property as part of the diagnostic dashboard, which when activated enables display of call stack and exception information in error messages by modifying a call stack attribute in a web application configuration file.

17. The computer-readable memory device of claim 15, wherein the diagnostic dashboard is configured to present diagnostic information across a multi-tier web application executed across a front end server, an application server, and a back end database server.

* * * * *